Nov. 4, 1958 W. H. FRANZMANN 2,859,035
MACHINE FOR MAKING MANIFOLD FORMS
Original Filed July 11, 1950 5 Sheets-Sheet 2

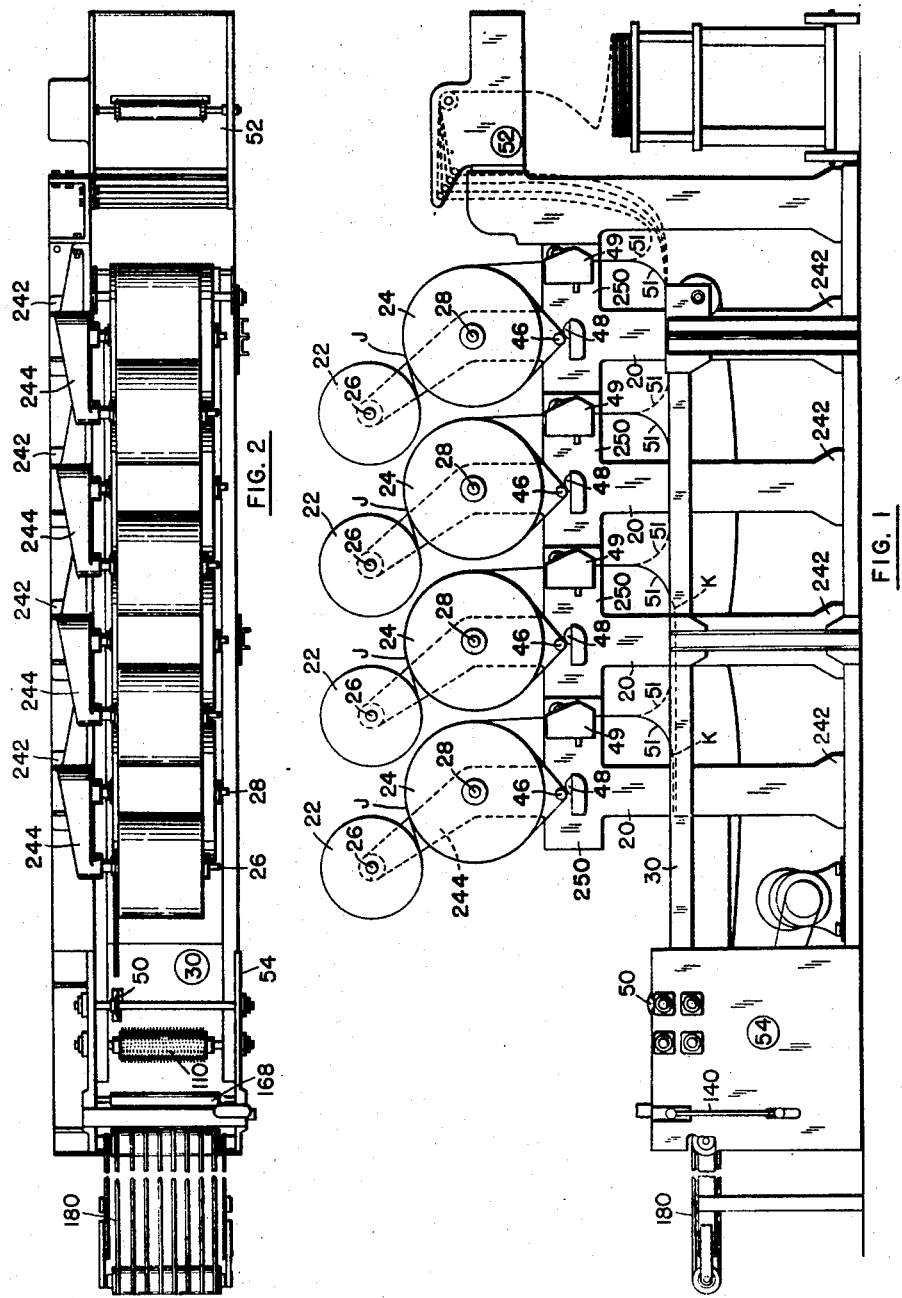

INVENTOR.
WILLIAM H. FRANZMANN
BY
ATTORNEY

Nov. 4, 1958 W. H. FRANZMANN 2,859,035
MACHINE FOR MAKING MANIFOLD FORMS
Original Filed July 11, 1950 5 Sheets-Sheet 3

INVENTOR.
WILLIAM H. FRANZMANN
BY
ATTORNEY

Nov. 4, 1958 W. H. FRANZMANN 2,859,035
MACHINE FOR MAKING MANIFOLD FORMS
Original Filed July 11, 1950 5 Sheets-Sheet 4
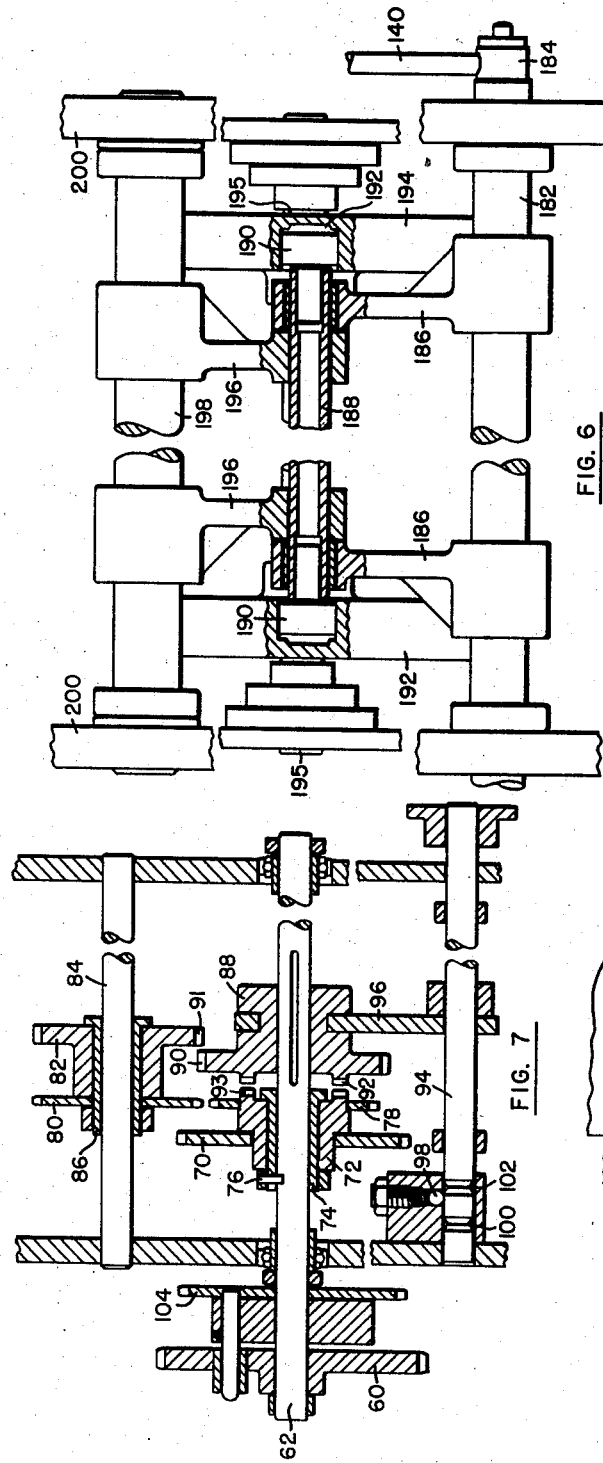
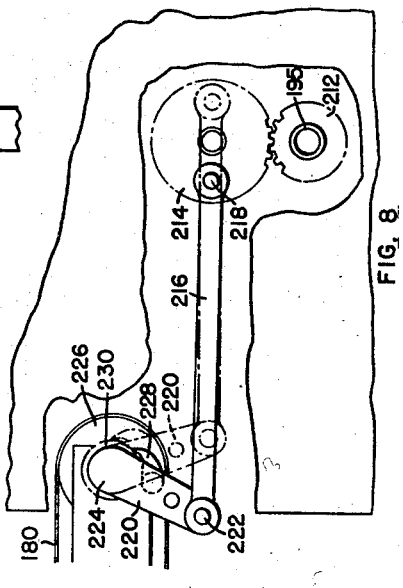
INVENTOR.
WILLIAM H. FRANZMANN
BY
ATTORNEY Nov. 4, 1958 W. H. FRANZMANN 2,859,035
MACHINE FOR MAKING MANIFOLD FORMS
Original Filed July 11, 1950 5 Sheets-Sheet 5
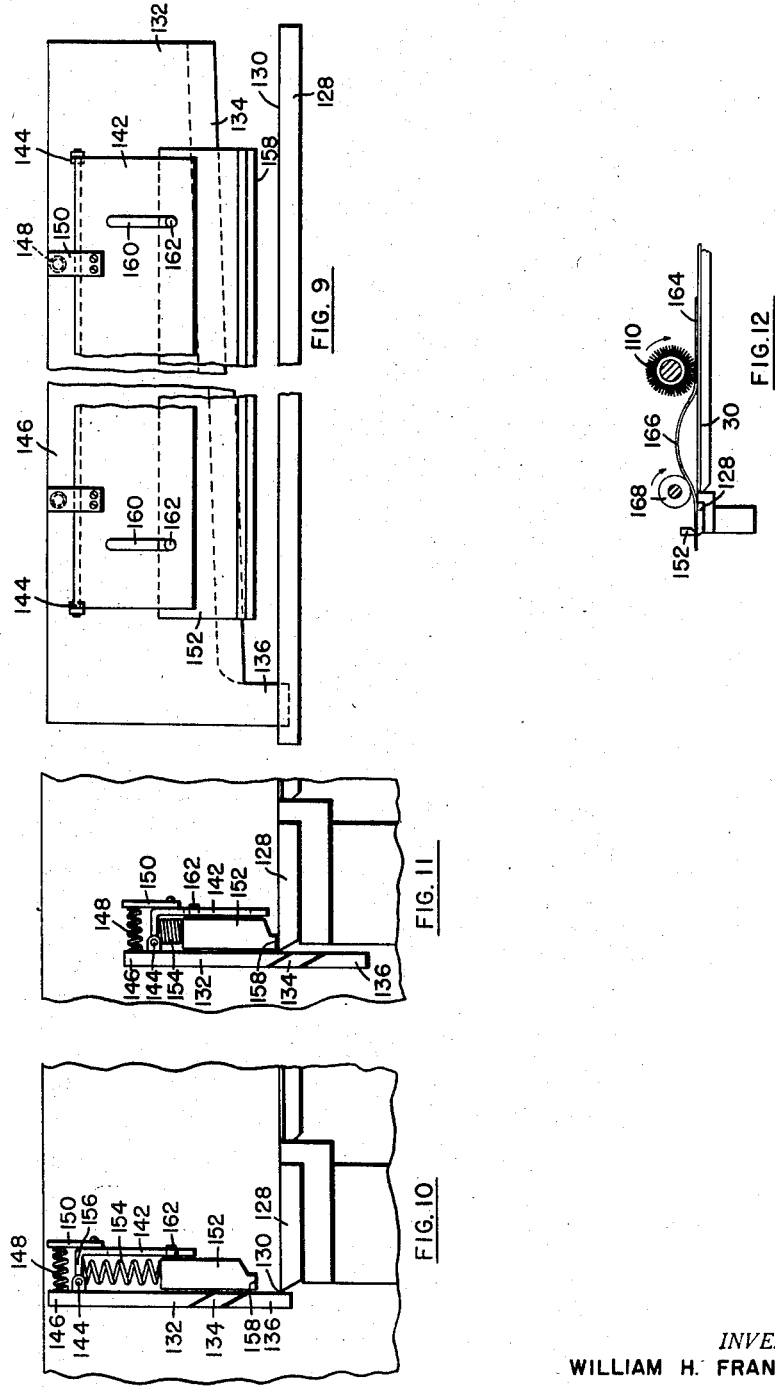
INVENTOR.
WILLIAM H. FRANZMANN
BY J Warren Kinney Jr.
ATTORNEY

United States Patent Office 2,859,035
Patented Nov. 4, 1958

2,859,035

MACHINE FOR MAKING MANIFOLD FORMS

William H. Franzmann, Hamilton, Ohio, assignor to The Hamilton Tool Company, Hamilton, Ohio, a corporation of Ohio Original application July 11, 1950, Serial No. 173,139, now Patent No. 2,766,984, dated October 16, 1956. Divided and this application October 1, 1954, Serial No. 461,840

4 Claims. (Cl. 271—2.1)

This application is a division of my co-pending application Serial No. 173,139 filed July 11, 1950, now Patent No. 2,766,984.

This invention relates to a method of and machine for selectively gathering, collating, or folding in zig-zag fashion a plurality of superposed, registered strips of indefinite length.

An object of the invention is to provide a roll supporting device having associated therewith a feeding table over which lengths of material from rolls mounted on said roll supports may be selectively conveyed in either of two directions.

Another object of the invention is to provide a device for stacking in registry a plurality of lengths of long continuous strip material on a feeding table having a combination gathering and collating mechanism at one end thereof and a zig-zag folder at the other end thereof.

Still another object of the invention is to provide a method of and machine for adhesively securing continuous lengths of record and transfer sheets together at a location above and prior to being deposited upon the feed table of my device and of then joining successive record sheets together on the feed table.

These and other objects are attained by the means described herein and as disclosed in the accompanying drawings, in which:

Fig. 1 is a side elevation of a device embodying the teachings of the present invention.

Fig. 2 is a top elevation of the device of Fig. 1.

Fig. 6 is a left end view of the cut-off element actuating-mechanism of Fig. 5.

Fig. 7 is a vertical sectional view taken through the reversing mechanism of the feeding-table conveyor.

Fig. 8 is a schematic view of the intermittent drive mechanism for the delivery conveyor of the combination gathering and collator mechanism which comprises a detail of the present invention.

Fig. 9 is a front plan view of a cut-off knife assembly comprising a detail of the present invention.

Fig. 10 is an end view taken from the right side of Fig. 9 showing the knife assembly in a fully raised, inoperative position.

Fig. 11 is a view similar to Fig. 10 disclosing the knife assembly in a lowered, operative position.

Fig. 12 is a side schematic view of a gathering operation illustrating the relationship of the aligned sheets immediately preceding the cut-off knife at the moment of severance of a previous group of sheets therefrom.

Figure 3:
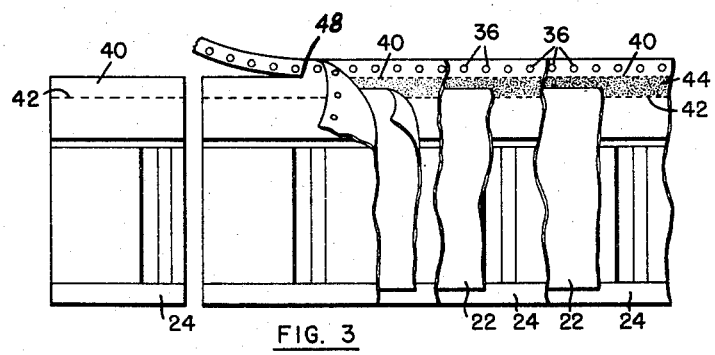
Fig. 3 is a plan view illustrating a series of alternate record and transfer sheets in collated form, such as may be formed by the device of Figs. 1 and 2.

With particular reference now to Figs. 1 and 2, the numerals 20 denote generally a plurality of similar bracket members adjacent ones of which are securely though releasably interconnected for providing a device having the desired roll supporting capacity. In the preferred embodiment of the invention a roll of transfer material 22 and a roll of record material 24 are rotatably supported upon spindles 26 and 28, respectively, which are secured to and carried by bracket 20.

A feed table, or so-called strip support 30 is provided onto which strips of record material 24 may be suitably deposited for engagement with a conveyor 32 (Fig. 5) provided with a plurality of laterally spaced projections 34 that extend therefrom and that are adapted to engage similarly spaced openings 36 (Fig. 3) provided along an edge of the record strips 24, thereby simultaneously maintaining each of said record strips in absolute registry and imparting a lineal motion for advancing them over said feed table, or support 30.

In those instances in which it is desired to provide strips of transfer material 22 in interleaved relationship with various of the record strips, such transfer strips may be loosely associated with or between adjacent record strips, or it may be fastened to and along an edge of a corresponding record strip such as, by way of example, edge glueing. This later process is extensively utilized when making so-called pull-apart forms in which strips of transfer material 22, see Fig. 3, are glued to an edge or band 40 forming part of record strip 24 from which it is severable along a predetermined tear line 42.

If desired, the strips of record material may be fed under spindle 46 whereby the inner edge of the outer face of said strips will be engaged by glue wheels 48 which apply a glue line 44, Fig. 3, with which the inner edge of an associated transfer strip will adhere thereby securing the transfer strips to bands 40. Those portions of glue line 44 beyond the inner edge of the transfer strips will adhere to the rear face of a superposed record strip thereby providing a unitary group of alternate strips of record and transfer material.

Figure 5:
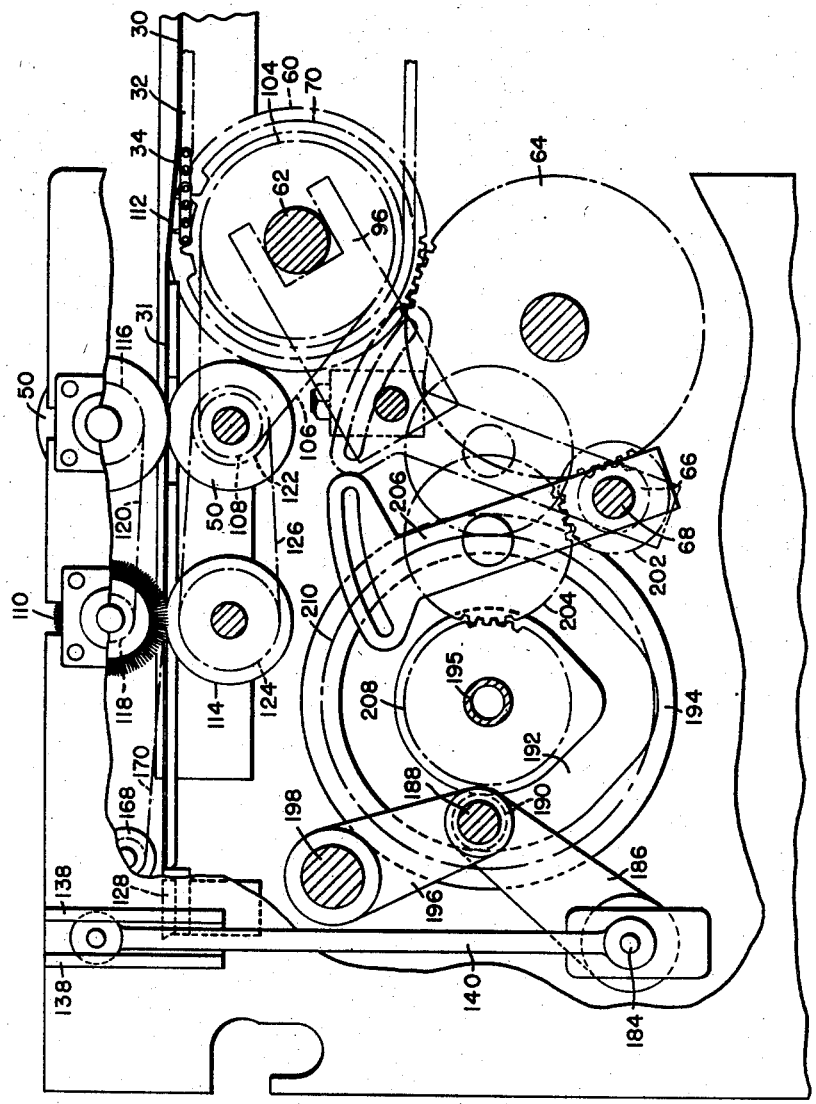
Fig. 5 is a schematic view of the feeding table conveyor and cut-off mechanism of the combination collating and gathering portion of the device.

In those instances wherein openings 36 are not desired in the finished product that portion of bands 40 in which the openings are located may be severed, as at 48 by means of slitter knives 50, see Figs. 1, 2 and 5.

With further reference to Figs. 1 and 2, it will be noted that the feed table or strip support extends between a zig-zag folder denoted generally by the numeral 52 and a combination collator and gathering device 54. The present invention is neither concerned with nor directed to the structural details of the folding device which may, solely by way of example and not of restriction, be similar to the Folding Machine disclosed in U. S. Patent No. 1,938,536 dated December 5, 1933, of C. W. Brenn.

Figure 4:
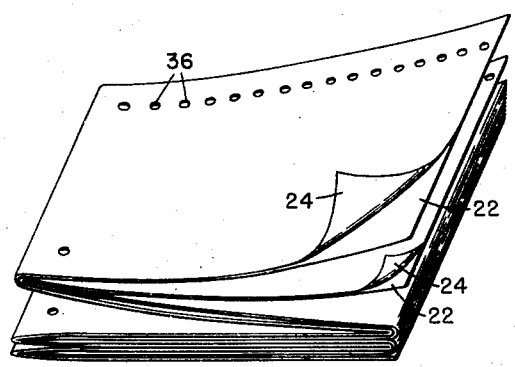
Fig. 4 is a perspective view of a series of alternate record and transfer sheets which have been folded in zig-zag form by the zig-zag folding mechanism disposed at the right end of the machine of Fig. 1.

Fig. 4 discloses a typical example of interleaved record sheets folded in zig-zag fashion.

One of the outstanding features of my device resides in the fact that I have utilized a single roll supporting and strip feeding device for delivering aligned, superposed strips of material to devices which will perform any one of three entirely different operations thereon, viz., folding, collating or gathering. Heretofore a separate machine was required for each of these operations which resulted in a considerable amount of money being tied up in several different, independent machines.

In Figs. 5 and 7, the means utilized to reverse the direction of travel of conveyor 32 for selectively delivering superposed strips to either end of the feed table have been illustrated. The numeral 60 denotes a gear secured in driving relationship with clutch shaft 62, and in driven relationship with intermediate gear 64 which engages drive gear 66 of main drive shaft 68 which is rotated at a substantially constant speed by suitable means, not illustrated. A conveyor chain drive sprocket 70 is secured to and carried by gear 72 which is loosely or rotatably mounted on antifriction sleeve 74 secured, as by pin 76, to the clutch shaft. A second sprocket wheel 78 is secured to and carried by gear 72 and connected, by means of a chain not illustrated, to sprocket wheel 80 fixedly secured to a spur gear 82 which is loosely or rotatably mounted to idler shaft 84 by means of an antifriction member 86.

A clutch gear 88 having a set of teeth 90 and a second set 92 is keyed to clutch shaft 62 for axial movement therewith in response to axial movement of shifter shaft 94 which is transmitted thereto by shifter yoke 96. Shaft 94 will normally be retained at one end or the other of its operative stroke such as by means of a spring loaded ball 98 which when seated in either of the laterally spaced grooves 100 or 102 will effectively preclude accidental or unintentional movement of the shifter shaft.

It will be observed that when the shifter shaft, yoke and gear 88 have been disposed to the left ball 98 will be seated in annular groove 102 and sprocket wheel 70 will be rotated in the same direction as drive gear 60 through shifter gear 88, teeth 92 of which will engage teeth 93 of gear 72 to which the sprocket wheel is fixedly secured. When the shifter shaft, yoke and gear have been moved to the right for disposing ball 98 in annular groove 100 teeth 90 of the shifter gear will engage teeth 91 of gear 82, thereby rotating said gear and sprocket wheel 80 in an opposite direction to the direction of rotation of drive gear 60. The rotary motion of sprocket wheel 80 is transmitted to sprocket wheel 70 via a sprocket chain, not illustrated, sprocket wheel 78 and gear 72, thereby providing simple yet effective means for reversing the direction of travel of conveyor 32.

In Figs. 5 and 7 the numeral 104 denotes a sprocket wheel for driving slitter knives 50 via sprocket chain 106, and sprocket wheel 108, it being noted that these knives may be geared whereby to rotate in unison. The peripheral speed of knives 50 will be considerably greater than the linear rate of travel of the conveyor by reason of the difference in diameter of sprocket wheels 104 and 108.

In the preferred embodiment of the invention a rotatable member in the form of brush 110 transversely spans strip support 30 for engaging strips advanced over said support in such a manner as to yieldably maintain said strips in contact with the support while simultaneously drawing or advancing said strips along said support.

As best disclosed in Fig. 5 conveyor 32 terminates short of the slitter knives 50. A leaf plate 112, inclined as illustrated, is provided for automatically lifting the leading portions of the strips of record material for disengaging or withdrawing projections 34 from the spaced openings 36 (Fig. 3) without disturbing the alignment or registry of the superposed record strips 24 which are thereby transferred onto a higher elevation 31 of the feed table or strip support 30.

In order to insure positive tensions on the composite web of superposed strips after leaving the conveyor, a cylinder 114 is rotatably journaled in vertical alignment with member 110 which preferably is rotated faster than the cylinder through sprocket wheels 116 and 118 and chain 120, whereas the cylinder may be driven through sprocket wheels 122, 124 and chain 126, as illustrated.

A reciprocable knife assembly is provided at the left discharge end of support 30 for severing into individual sheet size the continuous lengths of strip material fed thereto. The knife assembly comprises a shear plate 128, disposed transversely of support 30, having a cutting edge 130, Figs. 9, 10 and 11. A knife element 132 having an inclined cutting edge 134, the lower end of which terminates in a downwardly projecting portion 136 is mounted for reciprocating motion between guide elements 138, Fig. 5, in response to movement of actuator rod 140 suitably secured to a knife actuator member 142 to which that end of the knife remote from cutting edge 134 is pivotally mounted, as at 144. Suitable means, such as, by way of example, a spring 148, interposed between that portion 146 of the knife beyond its pivotal axis and an abutment plate 150 secured to and carried by member 142, may be employed for normally and yieldingly urging the lower portions of the knife in contacting or abutting relationship with cutting edge 130 of the shear plate, thereby insuring an optimum operating relationship between the knife and shear plate.

In order to momentarily stop the continuous forward motion of the continuous strips being fed to the knife assembly incident to and during those periods of time when the knife is in the lowered, operative, strip-severing position of Fig. 11, a holding blade 152 is provided for contacting and engaging the strip material immediately preceding the knife. If desired, blade 152 may be mounted between adjacent faces of knife 132 and actuator member 142 for sliding movement relative to each. A spring 154 may be interposed between the upper face of the blade and the upper horizontal leg 156 of member 142 for normally and yieldably urging the lower edge 158 of the blade below cutting edge 134 of knife 132 when it is in the raised, inoperative position illustrated in Figs. 9 and 10. The maximum relative movement between the holding blade and member 142 is a function of and determined by the relationship of slots 160 in said member and interfering elements 162 secured to the blade and dimensioned to slidably engage said slots.

As knife element 132 is lowered on a cutting cycle the lower edge 158 of the holding blade will clampingly engage the strip material and stop its forward motion before the cutting edge of the knife engages the material. As the knife is raised after a cutting operation the holding blade will be elevated thereby freeing or releasing the strip material to be advanced beneath the knife.

Since the strip material is continuously fed or advanced over support 30 and thence under continuously rotating members 110, lowering of the holding blade into contacting relationship with web or strips of material 164 will result in the formation of a loop 166, Fig. 12. To insure uniformity of cut-off lengths, I provide means closely adjacent the knife assembly for accelerating the looped portions 166 of the web or strips forwardly over shear plate 128 immediately upon release of the holding blade, thereby removing the loop. I have obtained uniformly excellent results in those instances wherein a second high speed rotatable member 168 is mounted transversely of support 30 at a location closely adjacent the knife assembly, such as at the leading edge of shear plate 128, see Figs. 2, 5, and 12. This member may be driven by rotatable element 110 by means of a chain drive 170.

With particular reference to Figs. 5 and 12, it will be observed that the high speed rotatable member 168 is mounted above or in spaced relationship with the mean plane of the discharge end of the strip support by a dimension in excess of the overall thickness of the web or superposed layers of strip material 164 so as to be out of contact therewith during those periods of time when the material is normally and continuously being advanced over its support. However, when the normal forward movement of the material is interrupted incident to actuation of the knife assembly the rotatable members 110 and 168 will define the opposite ends of the resultant loop 166 formed in the material.

Rotatable member 110 will continuously and automatically maintain the desired tension in those portions of the strips or web located between it and the discharge end of conveyor 32, whereas member 168, the outer perimeter of which is substantially smooth, will slippingly engage the forward portion of the web loop, Fig. 12. The moment holding blade 152 is released from contact with the web the rotary motion of member 168 will become effective to impart an accelerating force to the forward end of the loop 166 thereby projecting the material comprising the loop forwardly of and beyond the cutting edge of the shear plate thereby permitting the web or strips 164 to be once again fed forwardly over the shear plate at the uniform linear rate of conveyor 32.

From the foregoing it will be observed that I have thus provided simple yet highly effective means for providing an intermittent movement to the forward portion of a continuous web which is moved at a uniformly continuous rate to the knife assembly.

With particular reference now to Fig. 1, it will be observed that the roll supporting and feeding mechanism has been constructed and arranged in such a manner as to deposit interleaved webs upon strip support 30 for delivery to either end of the table, thereby clearly distinguishing from prior art devices in which interleaved strips can be fed in but one direction of travel.

The strips of record material 24, as hereinabove stated, are fed downwardly under spindle 46 whereby glue roller 48 will apply a continuous strip of adhesive to the inside, that is, that edge of the strip adjacent inclined arm 244. As the strip of record material reaches point J, it will be engaged by a strip of transfer material 22 which will be laid thereon in such a manner as to effect a joining of the sheet of transfer material to the sheet of record material, along one edge thereof, thereby securing the sheet of transfer material to its associated sheet of record material.

From the point indicated by the letter J to the point indicated by the letter K, the sheets of joined transfer and record material are fed downwardly, through a suitable feeding mechanism indicated generally by the numeral 49, whereby the composite web indicated generally by the numeral 51 will be laid upon said table 30, with the edge apertures 36 of the record sheet portion of composite web 51 engaging projections 34 of table conveyor 32.

As illustrated in Fig. 3, the adhesive strip 44 is of a width whereby to extend beyond the upper edge of transfer strip 22 whereby the same adhesive strip will effectively secure the record sheet portion of the next lower composite web 51 at location K. In other words, each sheet of record material is secured to a sheet of record material is secured to a sheet of transfer material at a location above and prior to being deposited on the feed table, and the successive strips of record material are then interconnected on the feed table. This manner of construction permits the rolls of record and transfer material to be mounted in an easily accessible, easily observable location above the feed table, as illustrated.

It should be understood that various changes and modifications may be made in the structural details of the device, within the scope of the appended claims, without departing from the spirit of the invention.

What is claimed is:

1. A device for selectively interleaving and delivering in one or the other of two directions a plurality of continuous lengths of strip material having spaced openings along one edge, said device including an elongate horizontal strip support, means including mechanism for engaging said strip material along said one edge for moving interleaved strip material selectively in either direction along said support, a first mechanism disposed at one end of said support for receiving strip material and operating upon the same when said means moves the strip material toward said one end of the support, a second mechanism positioned at the opposite end of said support for receiving said strip of material when said means moves the strip toward said opposite end of the support, whereby dependent upon direction of movement of the strip material along said support, one or the other of the first or second mechanism will operate upon the strip material, a plurality of roll supporting means spaced along and over the strip support for rotatably mounting rolls of continuous lengths of strip material, means feeding the strip material from the respective roll supporting means down onto the means for moving the strip along the support.

2. In a device as defined in claim 1 wherein the means for moving the strip material along said support comprises an endless conveyor having a strip carrying flight disposed above said support.

3. A device as defined in claim 2 wherein the conveyor driving means includes a clutch shaft, an idler shaft and a shifter shaft disposed in spaced parallelism, means driving the clutch shaft in one direction, a driven gear rotatably mounted on the clutch shaft, a clutch gear keyed to the clutch shaft for axial movement thereon, a driven gear rotatably mounted on the idler shaft, a shifter yoke secured to and carried by the shifter shaft engaging the clutch gear, said clutch gear being shiftable along the clutch shaft to a position in direct driving engagement with the driven gear, to a position in direct driving engagement with the driven gear on the idler shaft and to an intermediate neutral position, between said gears, means connecting the driven gears of the clutch and idler shafts for concurrent rotation, means mounting the shifter shaft for endwise axial movement, and means connecting the driven gear of the clutch shaft relative to and in driving relationship with said conveyor.

4. A device for selectively interleaving and delivering in one or the other of two directions a plurality of continuous lengths of strip material having spaced openings along an edge, said device including an elongate horizontal strip support, an endless conveyor extending along the strip support for supporting and moving strip material and including mechanism adapted to engage the openings along the edge of the strip material to maintain a plurality of strips in registration throughout their linear travel over said support, means for driving said conveyor and including selectively reversible mechanism for reversing the drive movement of the conveyor, a plurality of roll supporting means spaced along and over said conveyor for rotatably mounting the rolls of continuous lengths of strip material, means feeding the strip material from the respective roll supporting means down onto said conveyor whereby upon one directional movement of the conveyor, the individual strips travel with the conveyor and over said support from a point of initial engagement with said conveyor toward a corresponding end of the support and in the opposite directional movement of the conveyor travel over the support from such initial point of contact with the conveyor toward the opposite end of the support, and mechanism at each end of said support for effecting different operations upon said strip material and for operating thereon as said conveyor moves the strip material toward the corresponding end of the support, whereby the device is capable of performing at least two different operations upon the strip material.

References Cited in the file of this patent

UNITED STATES PATENTS

| | | |
|---|---|---|
| 1,159,638 | Barber | Nov. 9, 1915 |
| 1,884,760 | Lake | Oct. 15, 1932 |
| 1,897,654 | Pfeiffer | Feb. 14, 1933 |
| 2,140,028 | Nichols | Dec. 13, 1938 |
| 2,384,385 | Madeira | Sept. 4, 1945 |
| 2,524,064 | Masterson | Oct. 3, 1950 |
| 2,633,354 | Mixer | Mar. 31, 1953 |